US006188976B1

(12) United States Patent
Ramaswamy et al.

(10) Patent No.: US 6,188,976 B1
(45) Date of Patent: Feb. 13, 2001

(54) APPARATUS AND METHOD FOR BUILDING DOMAIN-SPECIFIC LANGUAGE MODELS

(75) Inventors: Ganesh N. Ramaswamy, Ossining; Harry W. Printz, New York; Ponani S. Gopalakrishnan, Yorktown Heights, all of NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/178,026

(22) Filed: Oct. 23, 1998

(51) Int. Cl.[7] ............................ G06F 17/20; G06F 17/27; G10L 15/00
(52) U.S. Cl. .................................... 704/9; 704/1; 704/255
(58) Field of Search ............................ 704/1, 9–10, 255, 704/256, 257, 265

(56) References Cited

U.S. PATENT DOCUMENTS

| | | | |
|---|---|---|---|
| 5,444,617 | * | 8/1995 | Merialdo ............................ 704/255 |
| 5,613,036 | * | 3/1997 | Strong ................................ 704/255 |
| 5,640,487 | * | 6/1997 | Lau et al. ........................... 704/255 |
| 5,899,973 | * | 5/1999 | Bandara et al. ..................... 704/256 |

OTHER PUBLICATIONS

Placeway, P., "The Estimation of Powerful Language Models From Small and Large Corpora" IEEE 1993, pp. II–33–II–36.*

Masataki et al., "Task Adaptation Using Map Estimation in N–Gram Language Modeling," IEEE International Conference on Acoustics, Speech and Signal Processing, vol. 2, pp. 783–786, Munich, Apr. 1997.

Crespo et al., "Language Model Adaptation for Conversational Speech Recognition Using Automatically Tagged Pseudo–Morphological Classes," IEEE International Conference on Acoustics, Speech and Signal Processing, vol. 2, pp. 823–826, Munich, Apr. 1997.

Farhat et al., "Clustering Words for Statistical Language Models Based on Contextual Word Similarity," IEEE International Conference on Acoustics, Speech Pricessing, vol. 1, pp. 180–183, Atlanta, May 1996.

Iyer et al., "Using Out–Of–Domain Data to Improve In–Domain Language Models," IEEE Signal Processing Letters, vol. 4, No. 8, pp. 221–223, Aug. 1997.

Issar, S., "Estimation of Language Models for New Spoken Language Applications," International Conference on Spoken Language Processing, vol. 2, pp. 869–872, Philadelphia, Oct. 1996.

Brown et al., "Class–Based n–gram Models of Natural Language," Computational Linguistics, vol. 18, No. 4, pp. 467–479, 1992.

* cited by examiner

Primary Examiner—Forester W. Isen
Assistant Examiner—Patrick N. Edouard
(74) Attorney, Agent, or Firm—F. Chau & Associates, LLP

(57) ABSTRACT

Disclosed is a method and apparatus for building a domain-specific language model for use in language processing applications, e.g., speech recognition. A reference language model is generated based on a relatively small seed corpus containing linguistic units relevant to the domain. An external corpus containing a large number of linguistic units is accessed. Using the reference language model, linguistic units which have a sufficient degree of relevance to the domain are extracted from the external corpus. The reference language model is then updated based on the seed corpus and the extracted linguistic units. The process may be repeated iteratively until the language model is of satisfactory quality. The language building technique may be further enhanced by combining it with mixture modeling or class-based modeling.

21 Claims, 5 Drawing Sheets

APPARATUS AND METHOD FOR BUILDING DOMAIN-SPECIFIC LANGUAGE MODELS

BACKGROUND OF THE INVENTION

The present invention relates to building statistical language models that are pertinent to a specific domain or field.

Statistical language models are used heavily in speech recognition, natural language understanding and other language processing applications. Such language models are used by a computer to facilitate comprehension of a language processing task, akin to a human employing context to understand spoken language. For instance, a speech recognition program will use a language model to select among phonetically equivalent words such as "to", "too" and "two", when creating a transcription.

Generally, it is impractical to construct a language model that covers an entire spoken language, including specialized and technical fields. Such a language model requires large memory storage and presents a complex processing task. Hence, domain-specific language models have been developed which are tailored to a specific domain or field. For instance, a speech recognition program may be tailored specifically for: medical writings; legal writings; or to a user's spoken questions and commands during use of a particular Internet site (e.g., sports, travel); and so forth. The domain-specific language model approach conserves memory, reduces complexity of the processing task, and reduces the word-error rate as compared to general (domain-unrestricted) language models.

Building a language model usually requires a large amount of training data, which is burdensome to obtain. By way of example, training data for the language model component of a speech recognition program geared for medical dictation may be obtained by manual, human transcription of large volumes of dictation recorded from doctors. Because this is so time consuming, it is desirable to have a method for the construction of a domain-specific language model that uses a very small amount of training data.

A number of prior art techniques have attempted to resolve this problem by employing some form of class-based language modeling. In class-based language modeling, certain words are grouped into classes, depending on their meaning, usage or function. Examples of class-based modeling are disclosed in: Brown et al., "Class-Based N-Gram Models of Natural Language", *Computational Linguistics*, Vol. 18, No. 4, pp. 467–479, 1992; and Frahat et al., "Clustering Words for Statistical Language Models Based on Contextual Word Similarity", *IEEE International Conference on Acoustics, Speech and Signal Processing*, Vol. 1, pp. 180–183, Atlanta, May 1996.

Other conventional methods allowing for a reduction in the requisite training data employ some form of mixture modeling and task adaptation. See, for example, Crespo et al., "Language Model Adaptation for Conversational Speech Recognition using Automatically Tagged Pseudo-Morphological Classes", *IEEE International Conference on Acoustics, Speech and Signal Processing*, Vol. 2, pp. 823–826, Munich, April 1997; Iyer et al., "Using Out-of-Domain Data to Improve In-Domain Language Models", *IEEE Signal Processing Letters*, Vol. 4, No. 8, pp. 221–223, August 1997; and Masataki et "Task Adaptation Using MAP Estimation in N-Gram Language Modeling", *IEEE International Conference on Acoustics, Speech and Signal Processing*, Vol. 2, pp. 783–786, Munich, April 1997.

Embodiments of the present invention to be described exhibit certain advantages over these prior art techniques as will become apparent hereafter.

SUMMARY OF THE DISCLOSURE

The present invention pertains to a method and apparatus for building a domain-specific language model for use in language processing applications, e.g., speech recognition. A reference language model is generated based on a relatively small seed corpus containing linguistic units relevant to the domain. An external corpus containing a large number of linguistic units is accessed. Using the reference language model, linguistic units of the external corpus which have a sufficient degree of relevance to the domain are extracted. The reference language model is then updated based on the seed corpus and the extracted linguistic units. The procedure can be repeated iteratively until the language model is of satisfactory quality.

BRIEF DESCRIPTION OF THE DRAWINGS

The following detailed description, given by way of example and not intended to limit the present invention solely thereto, will best be appreciated in conjunction with the accompanying drawings, in which like reference numerals denote like parts or elements, wherein.

DETAILED DESCRIPTION OF CERTAIN PREFERRED EMBODIMENTS

Figure 1:
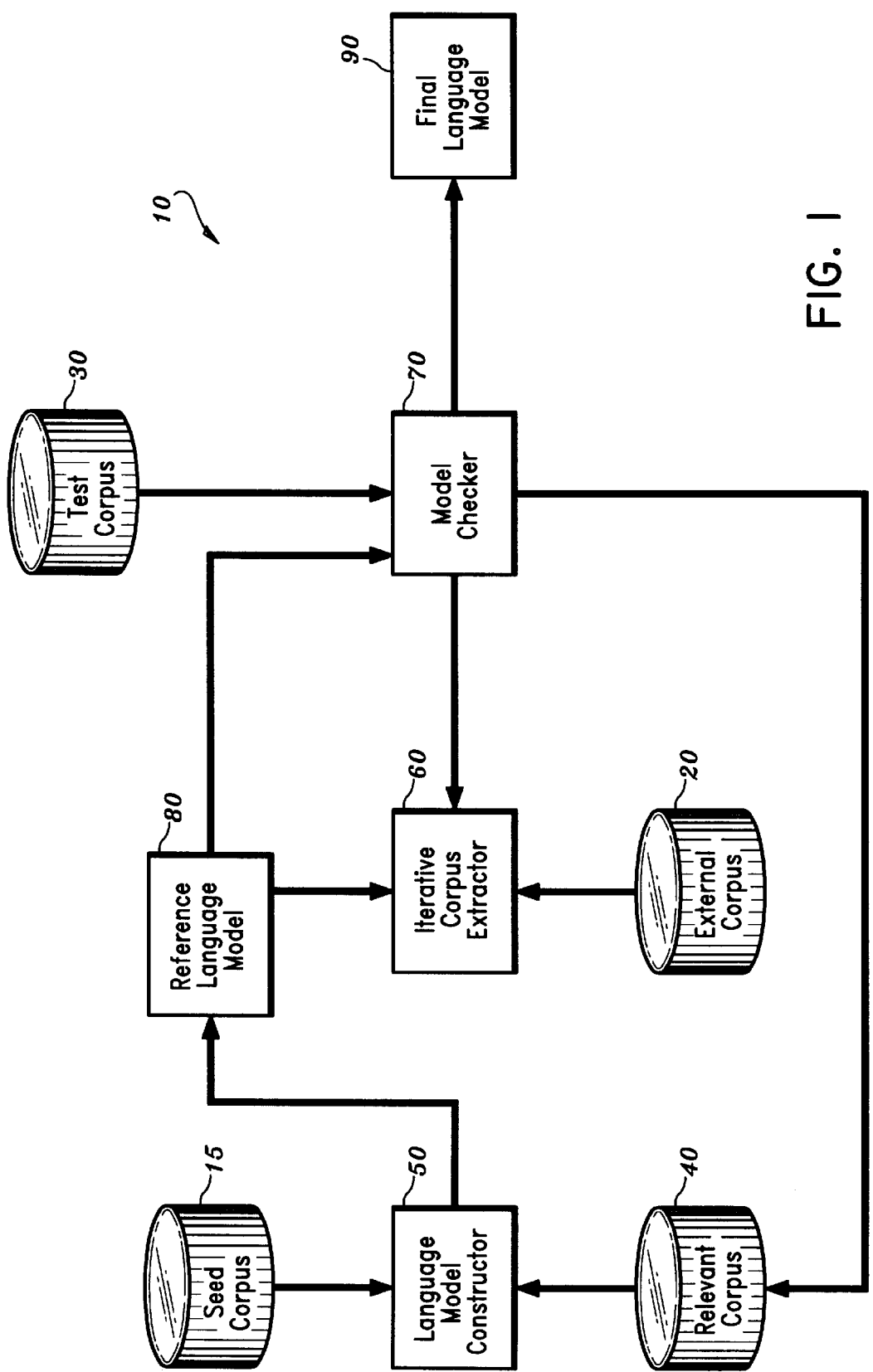
FIG. 1 is a block diagram of an illustrative iterative language model building apparatus in accordance with the invention.

With reference now to FIG. 1, an illustrative embodiment of a language model building apparatus, 10, in accordance with the invention is shown in block diagram form. As will be explained in detail hereafter, apparatus 10 utilizes an iterative language building technique to generate a final language model 90 from a small, domain-restricted seed corpus 15 and a large, less restricted external corpus 20. Final language model 90 is used in language processing applications such as speech recognition, natural language understanding or electronic translation applications.

Seed corpus 15 is a relatively small database of linguistic units such as sentences, paragraphs and phrases. The linguistic units are stored in files of text data on a computer-readable medium, e.g., an optical or magnetic portable disk or the hard disk of a personal computer. The linguistic units in seed corpus 15 are all highly relevant to a common domain or field, e.g., general or specialized medical vocabulary, legal vocabulary, user queries for a particular Internet site, etc. Seed corpus 15 can be generated by means of an automatic data collection process from domain-specific media, or manually via human input of the linguistic units to a computer.

Language model constructor 50, iterative corpus extractor 60 and model checker 70 can each be implemented as software routines executable on a computer or network of computers. Alternatively, they may embodied as individual firmware components designed to interact with one another.

Language model constructor 50 constructs reference language model 80 for storage on a computer-readable medium. The language model is essentially a set of language rules and computer-executable instructions that specify allowable sequences of vocabulary items.

Test corpus 30 contains linguistic units that are highly relevant to the domain, collected in the same manner as seed corpus 15. These linguistic units are stored as text information on a suitable storage medium. In addition, digitized audio data corresponding to the text is stored to form part of test corpus 30. The audio data is used by model checker 70 in a speech recognition test (discussed later) to measure the quality of reference language model 80.

External corpus 20 contains text data that is less relevant to the domain of interest than the data within the seed and test corpora. The external corpus data may be collected from various data sources such as Internet sites, and may include language modeling data from other domains. External corpus 20 can be stored as files on a hard disk of one or more computers. Note that a single program storage device such as an optical disk may be employed to store seed corpus 15, test corpus 30, language model constructor 50, iterative corpus extractor 60 and model checker 70. If sufficient space is available on the storage device, the external corpus may be stored there as well.

Figure 2:
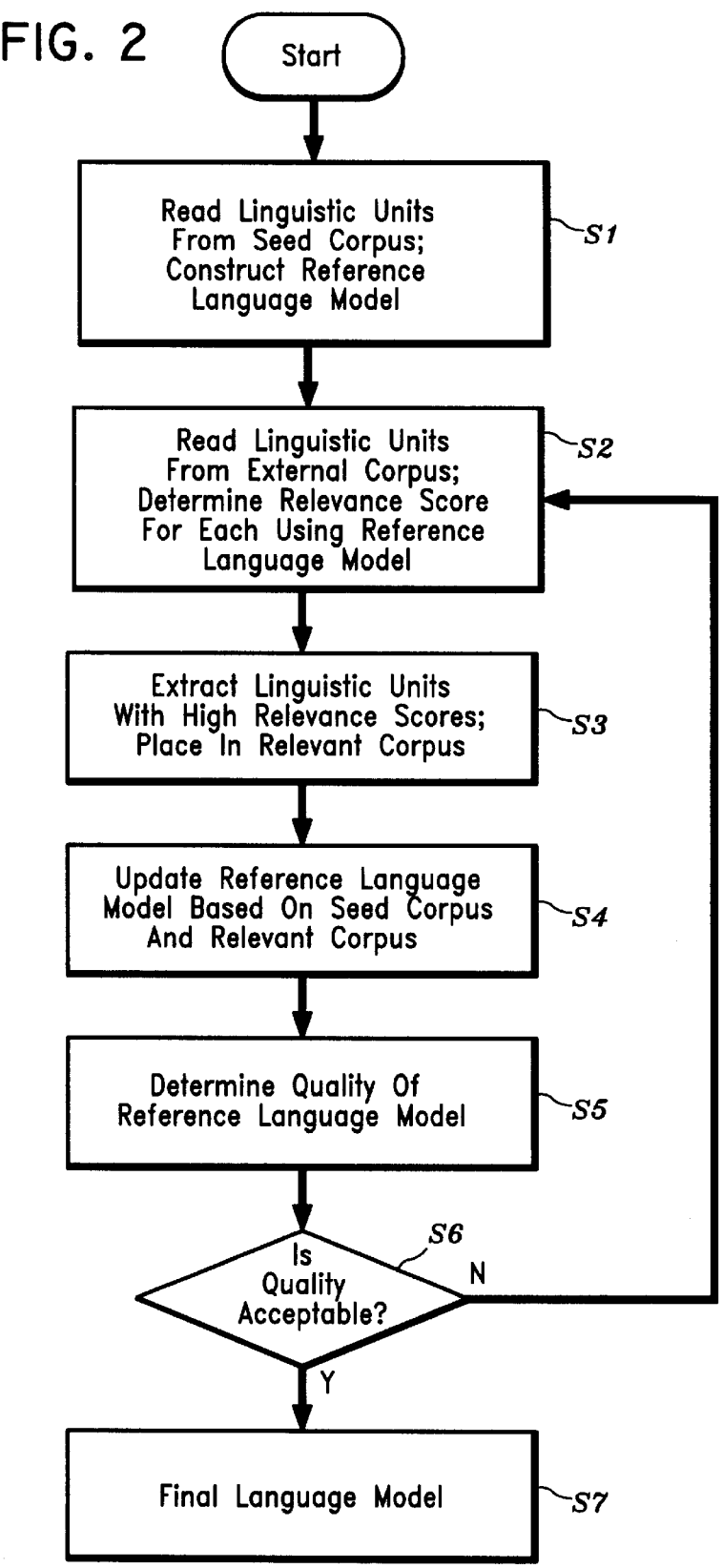
FIG. 2 is a flow diagram of an illustrative routine running within the apparatus of FIG. 1 for building a domain-specific language model.

Referring now collectively to the flow diagram of FIG. 2 and the block diagram of FIG. 1, language model constructor 50 reads linguistic units from seed corpus 10 and constructs an initial reference language model 80 from these linguistic units (step SI). The construction of reference language model 80 by model constructor 50 can be accomplished using one of several known language model building techniques. For instance, a number of suitable language model building techniques are disclosed in F. Jelinek, *Statistical Methods for Speech Recognition*, The MIT Press, 1997.

Once the initial reference language model 80 is generated, iterative corpus extractor 60 reads linguistic units from external corpus 20 and computes a relevance score for each linguistic unit in accordance with language model 80 (step S2). Linguistic units having high relevance scores (relevant to the domain of interest) are extracted and placed in relevant corpus 40 (step S3), which is typically stored in random access memory of the computing device. When a sufficient number "n" of linguistic units have been so extracted, language model constructor 50 uses all the data in seed corpus 15 and relevant corpus 40 to construct a new reference language model 80 (i.e., updating the previous one) in step S4. The number n can either be a predetermined fixed number or a number that dynamically varies with each language model building iteration. For example, n may be set based on a target percentage change in the size of the relevant corpus, so that the current iteration (of adding linguistic units to relevant corpus 40) can be considered complete if relevant corpus 40 increases by a certain percentage. Another approach that may be used is based not on the number of linguistic units added to relevant corpus 40, but rather on the number of external corpus linguistic units analyzed during a current iteration. That is, the current extraction iteration would be complete after a predetermined number of external corpus linguistic units have been analyzed for relevance to the domain.

Once reference language model 80 has been updated (i.e., rebuilt), its quality is evaluated by model checker 70 (step S5). If the quality is deemed unacceptable (step S6), another language building iteration encompassing steps S2–S4 is performed to again update reference model 80 in view of additional extracted linguistic units from external corpus 20. Model checker 70 again evaluates the language model quality, calling for further language building iterations, if necessary, until its quality is satisfactory. At that point, the final language model 90 is defined as the current, or immediately preceding, reference language model 80 (step S7).

Figure 3:
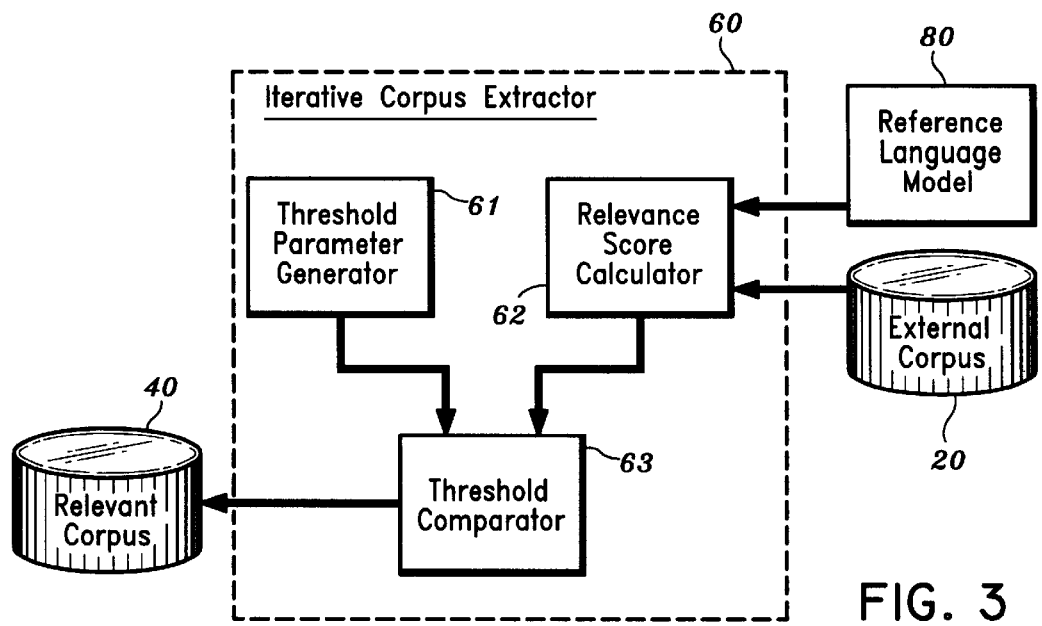
FIG. 3 illustrates an exemplary iterative corpus extractor.

Turning now to FIG. 3, an embodiment of iterative corpus extractor 60 is shown in relation to corpora 20, 40 and language model 80. Corpus extractor 60 includes a threshold parameter generator 61, a relevance score calculator 62 and a threshold comparator 63, each of which may be embodied as software or firmware. Relevance score calculator 62 accesses linguistic units from external corpus 20 and evaluates the degree of relevance to the domain of interest of each linguistic unit. The relevance evaluation is performed in conjunction with the current language model 80. One type of relevance score that may be employed is the perplexity measure, calculated according to language model 80. A given linguistic unit has a low perplexity measure if it has a high degree of relevance to the domain. Methods to compute perplexity measures are known in the art—see, e.g., Jelinek, *Statistical Methods for Speech Recognition*, supra. Other types of relevance scores may alternatively be used.

Threshold parameter generator 61 provides a relevance score threshold to which the relevance score of each linguistic unit (as determined by relevance score calculator 62) is to be compared. Threshold comparator 63 performs the comparison. If the relevance score of a particular linguistic unit passes the threshold, that linguistic unit is added to relevant corpus 40; otherwise, it is skipped over or erased. If the perplexity measure is used as the relevance score, the threshold parameter can be set to equal a specific percentile of the perplexity measures of the individual linguistic units of seed corpus 15, calculated according to reference model 80. In other words, each time reference model 80 is updated, the perplexity measures of the seed corpus linguistic units are computed based on the updated reference language model, then a perplexity measure distribution for the seed corpus is established, and the perplexity measure threshold is set based on the distribution. With this approach, threshold comparator 63 accepts only those linguistic units from external corpus 20 that are below the perplexity threshold, i.e., those that are more relevant to the domain (less perplexing). The accepted linguistic units are added to relevant corpus 40 (unless they already exist in the relevant corpus). By way of example, it has been found that setting the threshold parameter to about the 80th percentile of the seed corpus linguistic units yields satisfactory performance. Preferably, for the first external corpus extraction operation based on the initial reference language model 80, the relevance threshold is set higher than for subsequent extraction operations. That is, less relevant linguistic units are allowed to be extracted in subsequent operations.

Figure 4:
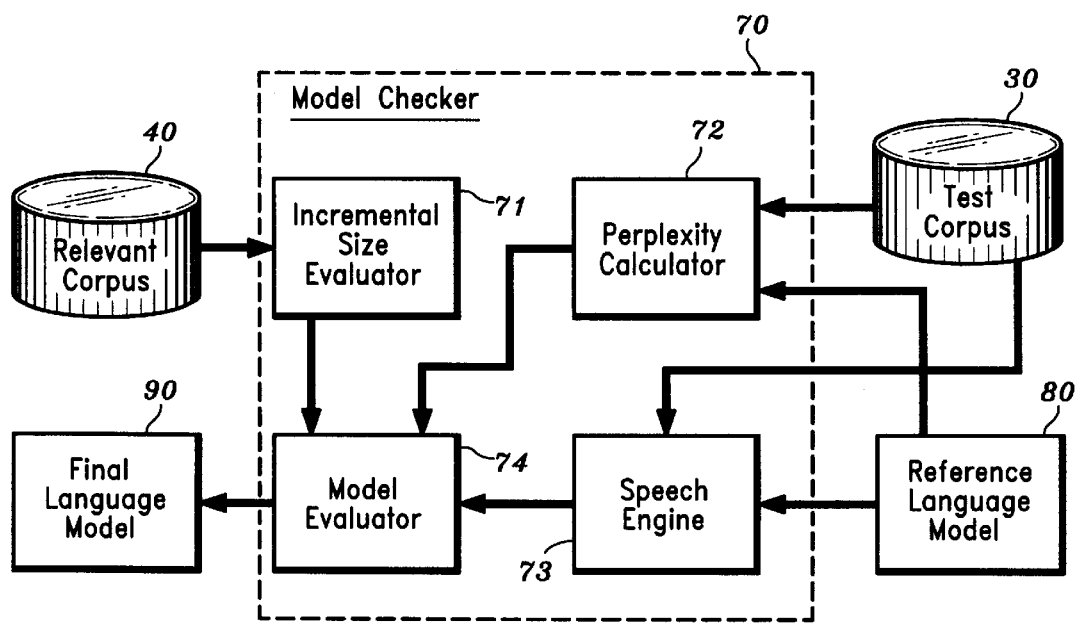
FIG. 4 illustrates an exemplary model checker.

With reference now to FIG. 4, a block diagram of an exemplary model checker 70 of language model building apparatus 10 is shown in relation to corpora 30, 40 and language models 80, 90. As stated previously, when a sufficient number of linguistic units extracted from the external corpus are added to relevant corpus 40, language model constructor 50 constructs a new reference language model 80 (thereby updating the previous one) using all the data in seed corpus 15 and relevant corpus 40. Model checker 70 then measures the quality of the updated reference language model 80. If the quality is deemed satisfactory, the iterative language building process is considered complete and no additional language building iterations are necessary. Otherwise, the system performs one or more additional iterations of extracting relevant linguistic units from external corpus 20 and then updating the reference language model based on the seed corpus and the cumulative data in relevant corpus 40.

Model checker 70 evaluates language model quality by using one or more of the following criteria: incremental linguistic unit size change; perplexity change; and speech recognition accuracy. As for the first criteria—it was stated previously that reference language model 80 is updated during a given iteration after a sufficient number of linguistic units are added to relevant corpus 40, or, after a certain number of external corpus linguistic units are analyzed for relevance. The incremental linguistic unit size change criteria is used in the latter case. An incremental size evaluator 71 computes the size of the linguistic units added to relevant corpus 40 during the most recent iteration. Model evaluator 74 then determines if the size of the most recently added linguistic units is substantially lower than those added during the prior iteration(s). If so, the quality of the most recent language model 80 may be considered acceptable based on this criteria alone.

To evaluate perplexity change, a perplexity calculator 72 calculates the perplexity score of the most recent reference language model 80 using test corpus 30. The score is supplied to model evaluator 74 which compares it to perplexity scores from the prior iteration(s). If the perplexity score for the current iteration is higher than those from prior iterations, indicating a reduction in quality, then the language model building process may be considered complete. Similarly, if the current perplexity score is about the same as, or only slightly lower than prior scores, indicating no significant improvement in quality for the current iteration, then the language model building process may be considered complete.

The third criteria, speech recognition accuracy, is evaluated by means of a speech recognition engine 73. Engine 73 accepts linguistic units from test corpus 30 in the form of digitized audio data. Concurrently, test corpus 30 provides the corresponding text data for those linguistic units to model evaluator 74. Speech recognition engine 73 analyzes the audio data content and converts it to modeled text data using the current reference language model 80. The modeled text data is supplied to model checker 74 which compares it to the corresponding raw text data from test corpus 30 to determine speech recognition accuracy for the current reference language model. If the accuracy for the current iteration is about the same or worse than that for prior iteration(s), the language building process may be considered complete. The construction of a suitable speech recognition engine 73 is known in the art—see, e.g., Jelinek, *Statistical Methods for Speech Recognition*, supra, for exemplary speech engine designs.

Model checker 74 may be designed to terminate the iterative language model building process when only a single one of the above three criteria are satisfied. Alternatively, termination may only be allowed when two or three of the criteria are satisfied. In any case, once a termination decision is made, model checker 74 informs corpus extractor 60 to cease further language building iterations and a final language model 90 is declared. The final model 90 is established as either the last reference model 80 or the next to last reference model (which is preferably stored in memory). The latter is preferably the choice when quality of the last language model 80 was determined to be lower than the previous one.

It is noted that scaled-down embodiments of model checker 70 are also possible if only one or two quality criteria are employed. For instance, model checker 70 may be designed to determine quality based solely on incremental linguistic unit size, in which case incremental size evaluator 71 and model evaluator 74 would be included, but test corpus 30, perplexity calculator 72 and speech engine 73 would not be necessary. Similarly, embodiments that exclude an incremental size evaluator 71 are also possible.

Figure 5:
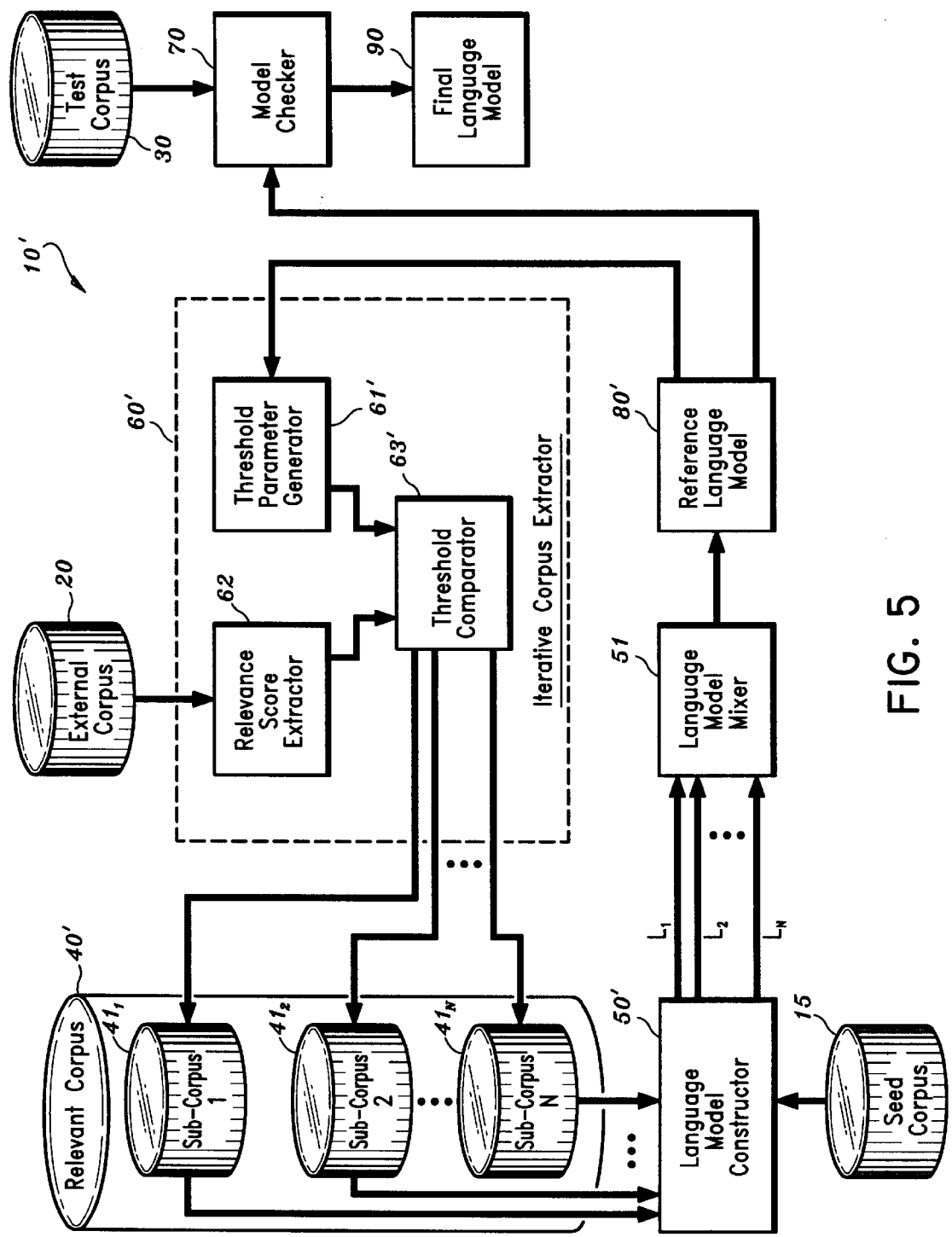
FIG. 5 is a block diagram of an illustrative language model building apparatus employing mixture modeling.

Referring now to FIG. 5, a block diagram of another embodiment 10' of a language building apparatus in accordance with the invention is illustrated. Apparatus 10' uses a mixture modeling approach to language model construction. As compared to the embodiment described above, this approach generally allows for a certain amount of less relevant linguistic units to be extracted from external corpus 20 to be used in the language building process. In this embodiment, relevant corpus 40' is partitioned into N subcorpora, $41_1$ to $41_N$, with each individual subcorpus having a different degree of relevance to the domain. Subcorpus $41_1$ contains the most relevant linguistic units whereas subcorpus $41_N$ contains the least relevant, albeit above some predetermined degree of relevance.

In operation, language model constructor 50' first constructs an initial reference language model 80 based on the linguistic units in seed corpus 15 as in the previous embodiment. A threshold parameter generator 61' calculates upper and lower threshold values of relevance scores for each of the subcorpora $41_1$ to $41_N$ such that relevance score ranges are established for each subcorpus. For instance, if the perplexity measure is used for the relevance score criteria, then subcorpus $41_1$ could be designated to store linguistic units falling between the jth and (j+k)th percentiles of the perplexity measures of the seed corpus; subcorpus $41_2$ could be designated to store those between the (j+k)th to (j+2k)th percentiles; and so forth. Relevance score calculator 62 calculates the relevance score of each linguistic unit read from external corpus 20 as in the previous embodiment. Threshold comparator 63' takes the relevance score of the currently read linguistic unit and then places the linguistic unit in the appropriate subcorpus $41_1$ to $41_N$, according to the threshold values provided by threshold parameter generator 61. (Linguistic units having relevance scores below the lower relevance threshold for subcorpus $41_N$ are skipped over or erased from memory.)

Once a sufficient number of linguistic units are extracted for the first iteration, language model constructor 50' builds N language models $L_1$ to $L_N$, each based on the linguistic units of the seed corpus and of an associated subcorpus. Generally, not all subcorpora need to be filled equally for a particular iteration to be complete; however, it is preferable to extract at least some highly relevant linguistic units for each iteration. In any case, the N models are provided to a language model mixer 51 where they are mixed together to form a new reference language model 80'. Such mixing of language models can be performed by a conventional technique such as that disclosed in F. Jelinek et al., "Interpolated Estimation of Markov Source Parameters from Sparse Data", *Workshop on Pattern Recognition in Practice*, pp. 381–397, Amsterdam, 1980. With the new reference language model 80 constructed, operation proceeds in basically the same manner as discussed above, i.e., model checker 70 evaluates the quality of the language model and then calls for further language building iterations if quality is deemed unsatisfactory.

Figure 6:
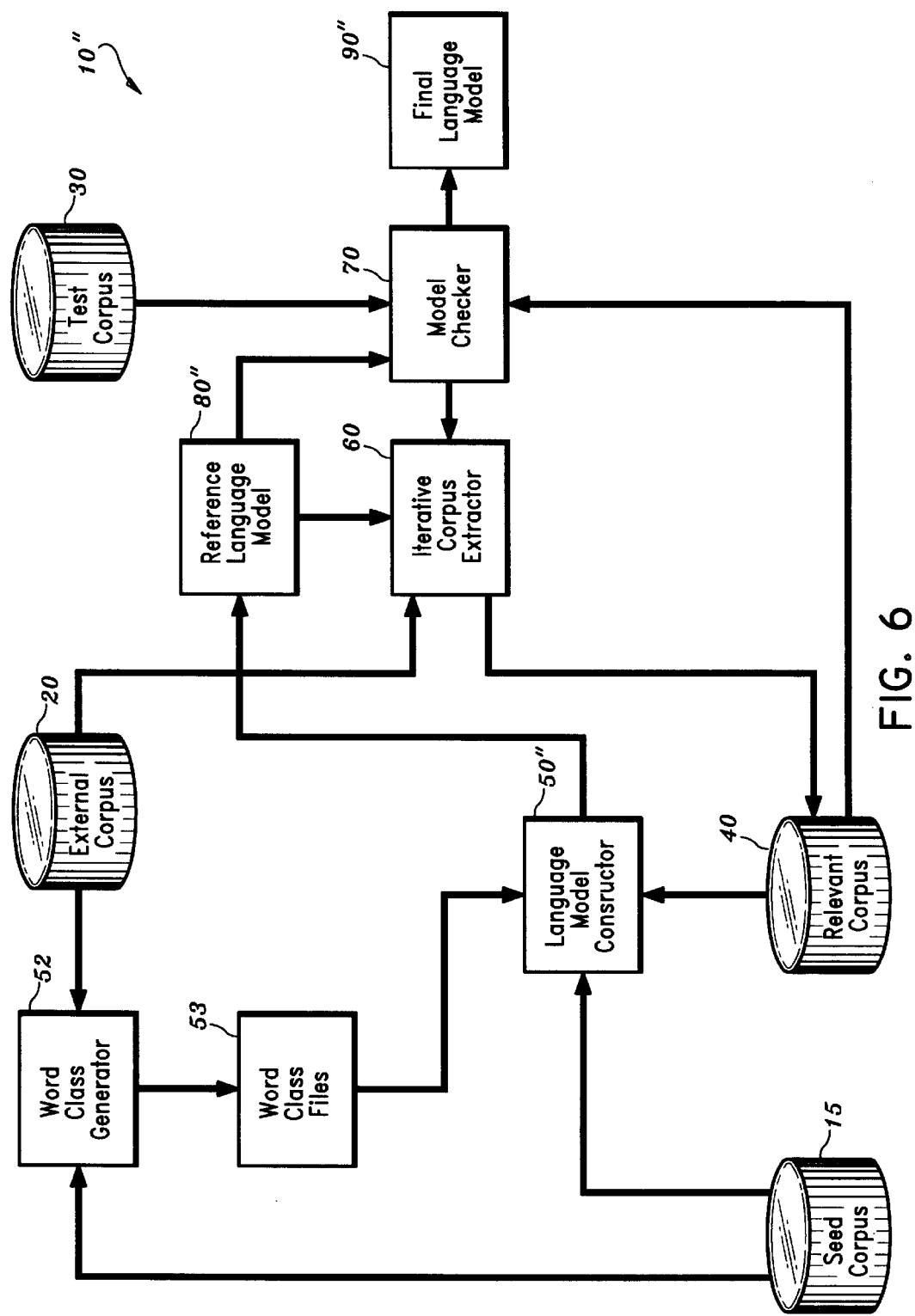
FIG. 6 is a block diagram of an illustrative language model building apparatus employing non-trivial word classes.

With reference now to FIG. 6, another embodiment 10" of a language building apparatus in accordance with the invention is illustrated, which employs a class-based modeling approach. In this variation, the linguistic units from seed corpus 15 and external corpus 20 are used by a word class generator 52 to generate files of non-trivial word classes 53. In so doing, certain linguistic units of external corpus that would otherwise fail a relevance test will now be considered relevant enough to be added to relevant corpus 40.

By way of example to illustrate the word classification concept, if the domain of interest is an electronic mail domain, seed corpus 15 may contain linguistic units such as: "show me the next e-mail" or "show me the next message". If the external corpus includes linguistic units drawn from an Internet air travel domain, for example, it may contain linguistic units such as "show me the next flight". In this example, word class generator 52 may decide to place "e-mail", "message" and "flight" in the same word class and store the class in the word class files 53. The word classes are then used by language model constructor 50" to generate a class-based reference language model 80" which is subsequently be used by iterative corpus extractor 60 to extract linguistic units from external corpus 20. The construction of word class generator 52 and the class-based language model constructor 50" are known in the art. Examples of these are presented in Brown et al., "Class-Based N-Gram Models of Natural Language", supra.

Class-based reference model 80" is updated in an iterative manner in essentially the same way as described above in connection with the embodiment of FIG. 1. Thus, model checker 74 measures the quality of the latest reference language model 80"; if the quality standard is not met, additional linguistic units of external corpus 20 are analyzed for relevance and those that meet the relevance criteria are added to relevant corpus 40; reference language model 80" is rebuilt based on seed corpus 15, word class files 53 and the cumulative linguistic units in relevant corpus 40; and so forth. Once quality is deemed satisfactory, a final class-based language model 90" is established.

Accordingly, the above-described embodiments of FIGS. 1–6 build a domain-specific language model by starting from a small, domain-restricted seed corpus and iteratively extracting linguistic units from a less restricted or non-specific external corpus, updating a reference language model with each iteration. As compared to the conventional language building models based on class-based modeling or mixture modeling/task adaptation, embodiments of the present invention afford certain technical advantages. First, the prior art solutions attempt to tune the parameters of the models without extending the corpus. Conversely, the embodiments disclosed herein do extend the corpus to build language models by introducing new raw data. Second, the embodiments disclosed herein are iterative, producing a series of language models, whereas most (if not all) prior art solutions are non-iterative. Further, the iterative language building process of the invention can be used in conjunction with mixture modeling or class-based modeling.

While the present invention has been described above with reference to specific embodiments thereof, it is understood that one skilled in the art may make many modifications to the disclosed embodiments without departing from the spirit and scope of the invention as defined by the appended claims.

What is claimed is:

1. A method for building a language model specific to a domain, comprising the steps of:
   a) building a reference language model based on a seed corpus containing linguistic units relevant to said domain;
   b) accessing an external corpus containing a large number of linguistic units;
   c) using said reference language model, selectively extracting linguistic units from said external corpus that have a sufficient degree of relevance to said domain; and
   d) updating said reference language model based on said seed corpus and said extracted linguistic units.

2. The method of claim 1, further comprising the steps of:
   measuring quality of said updated language model; and,
   repeating steps b), c) and d) if the measured quality is determined to be below a quality threshold, otherwise defining said updated language model as a final language model.

3. The method of claim 2 wherein the step of measuring quality comprises calculating perplexity of the updated reference language model using a test corpus containing linguistic units relevant to said domain.

4. The method of claim 2 wherein the step of measuring quality comprises:
   providing a test corpus containing linguistic units relevant to said domain; and
   evaluating speech recognition accuracy for said test corpus using said updated reference language model.

5. The method of claim 2 wherein the step of measuring quality comprises comparing the size of linguistic units extracted during a current linguistic unit extraction iteration to the size of linguistic units extracted during at least one prior extraction iteration.

6. The method of claim 1 wherein said step c) is performed by computing perplexity scores for individual linguistic units from said external corpus and selectively extracting those linguistic units having a perplexity score below a perplexity threshold.

7. The method of claim 6 wherein said perplexity threshold is computed dynamically, and corresponds to a percentile rank of perplexity measures of the linguistic units of said seed corpus, calculated according to the latest reference language model.

8. The method of claim 1, further comprising the steps of:
   forming N subcorpora of linguistic units from said linguistic units extracted from a test corpus, grouped according to degree of relevance to said domain;
   building N language models based on said seed corpus and said N subcorpora, respectively; and
   wherein said step of updating said reference language model includes mixing said N language models.

9. The method of claim 1 wherein said linguistic units of said seed corpus and said external corpus comprise sentences.

10. The method of claim 1, further comprising the step of generating word classes from said linguistic units of said seed corpus and said linguistic units extracted from said external corpus; and
    wherein said step d) of updating said reference language model is performed in accordance with said word classes so as to construct said updated reference language model as a class-based language model.

11. The method of claim 1 wherein said step d) of updating said reference language model is performed after a predetermined number of linguistic units have been selectively extracted from said external corpus in step c).

12. An apparatus for building a language model for a specific domain, comprising:
    a seed corpus containing linguistic units relevant to said domain;
    a language model constructor for building a reference language model from said seed corpus;

a corpus extractor operative to access an external corpus and, using said reference language model, to selectively extract linguistic units which have a sufficient degree of relevance to said domain;

wherein said language model constructor updates said reference language model based on said seed corpus and said extracted linguistic units.

13. The apparatus of claim 12, further comprising a model checker for measuring quality of said updated reference language model and defining said updated language model as a final language model if the measured quality is above a quality threshold, otherwise said corpus extractor selectively extracts additional linguistic units from said external corpus and said language model constructor again updates said reference language model based on said seed corpus and cumulative extracted linguistic units, so as to iteratively construct a final language model.

14. The apparatus of claim 13, further comprising:

a test corpus containing linguistic units relevant to said domain; and said model checker measuring quality of said updated reference language model with at least one of:

(i) a speech recognition engine to measure speech recognition accuracy of said reference language model using linguistic units of said test corpus;

(ii) a perplexity calculator to calculate perplexity of said updated reference language model using said test corpus; and (iii) an incremental size evaluator for evaluating the number of linguistic units selectively extracted from said external corpus during a current language building iteration.

15. The apparatus of claim 12 wherein said sufficient degree of relevance is dynamically determined by a threshold parameter generator of said corpus extractor which computes a perplexity threshold corresponding to a percentile rank of perplexity measures of the linguistic units of said seed corpus according to the latest version of said reference language model.

16. The apparatus of claim 12, further including a relevant corpus for storing said selectively extracted linguistic units, said relevant corpus comprising a plurality N of subcorpora grouped according to relevance to said domain, each dedicated to storing plural of said selectively extracted linguistic units falling within a certain range of relevance to said domain;

wherein said language model constructor is operative to construct N reference language models based on said seed corpus and said N subcorpora, respectively; and said apparatus further includes a language model mixer to mix said N reference language models to form said updated reference language model.

17. The apparatus of claim 16, further comprising:

a test corpus containing linguistic units relevant to said domain; and a model checker for measuring quality of said updated reference language model with at least one of:

(i) a speech engine to measure speech recognition accuracy of said reference language model using linguistic units of said test corpus;

(ii) a perplexity calculator to calculate perplexity of said updated reference language model using said test corpus; and (iii) an incremental size evaluator for evaluating the number of linguistic units selectively extracted from said external corpus during a current language building iteration.

18. The apparatus of claim 12, further comprising a word class generator for generating word classes from said linguistic units of said seed corpus and said linguistic units extracted from said external corpus; and wherein said language model constructor updates said reference language model in accordance with said word classes so as to construct said updated reference language model as a class-based language model.

19. The apparatus of claim 12 wherein said sufficient degree of relevance is higher for an initial iteration of external corpus linguistic unit extraction than for subsequent iterations.

20. A program storage device readable by a machine, tangibly embodying a program of instructions executable by the machine to provide method steps for building a language model specific to a domain, said method steps comprising:

a) building a reference language model based on a seed corpus containing linguistic units relevant to said domain;

b) accessing an external corpus containing a large number of linguistic units;

c) using said reference language model, selectively extracting linguistic units from said external corpus that have a sufficient degree of relevance to said domain; and d) updating said reference language model based on said seed corpus and said extracted linguistic units.

21. The method of claim 20 wherein said step c) is performed by computing perplexity scores for individual linguistic units from said external corpus and selectively extracting those linguistic units having a perplexity score below a perplexity threshold.

* * * * *